United States Patent
Sharma et al.

(10) Patent No.: US 6,242,388 B1
(45) Date of Patent: Jun. 5, 2001

(54) MUTUAL SOLVENTS COMPRISING 2,2,4-TRIMETHYL-1,3-PENTANEDIOL MONO-OR DI-ISOBUTYRATE AND STABLE EMULSIONS THEREOF

(75) Inventors: Mahendra Kumar Sharma; Ronald Allen Smith, both of Kingsport; Melissa Darlene Goodwin, Blountville, all of TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/197,494

(22) Filed: Nov. 23, 1998

(51) Int. Cl.[7] ....................................................... C09K 3/00
(52) U.S. Cl. .......................... 507/90; 507/261; 507/266; 507/267; 134/40; 510/188; 252/364
(58) Field of Search ................ 507/90, 261, 266, 507/267; 134/40; 510/188; 252/364; 516/56, 24

(56) References Cited

U.S. PATENT DOCUMENTS

| | | | |
|---|---|---|---|
| 2,124,530 | 7/1938 | Loomis et al. | 166/21 |
| 3,211,561 | 10/1965 | Gearhart et al. | 106/180 |
| 3,254,718 | 6/1966 | Dunlap | 166/42 |
| 3,376,246 | 4/1968 | Valentine et al. | 260/3.16 |
| 3,466,223 | 9/1969 | Beeler et al. | 161/162 |
| 3,481,404 | 12/1969 | Gidley | 166/307 |
| 3,548,945 | 12/1970 | Gidley | 166/307 |
| 3,819,520 | 6/1974 | Jones et al. | 252/8.55 C |
| 3,902,557 | 9/1975 | Shaughnessy et al. | 166/295 |
| 4,073,344 | 2/1978 | Hall | 166/307 |
| 4,318,241 | 3/1982 | Fassauer | 43/58 |
| 4,515,699 | 5/1985 | Oliver, Jr. et al. | 252/8.55 R |
| 4,925,497 | 5/1990 | Thierheimer, Jr. | 134/40 |
| 5,152,907 | 10/1992 | Dulaney et al. | 252/8.552 |
| 5,242,899 | 9/1993 | Binon | 507/119 |
| 5,310,002 | 5/1994 | Blauch et al. | 166/307 |
| 5,622,547 * | 4/1997 | Maslowski et al. | 507/90 |
| 5,634,984 * | 6/1997 | Van Slyke | 134/40 |
| 5,710,111 | 1/1998 | Van Slyke | 507/137 |
| 5,843,872 * | 12/1998 | Rayborn, Sr. et al. | 507/106 |
| 5,891,832 * | 4/1999 | Rayborn, Sr. et al. | 507/261 |
| 5,942,467 * | 8/1999 | Rayborn, Sr. et al. | 507/106 |
| 5,969,032 * | 10/1999 | Phan et al. | 524/460 |

* cited by examiner

*Primary Examiner*—Philip Tucker
(74) *Attorney, Agent, or Firm*—Harry J. Gwinnell; Matthew W. Smith

(57) ABSTRACT

A mutual solvent for use in oil and gas well operations comprising 2,2,4-trimethyl-1,3-pentanediol monoisobutyrate and/or 2,2,4-trimethyl-1,3-pentanediol diisobutyrate, a coupling solvent, and an acid stable surfactant. The coupling solvent is selected from ethylene glycol monobutyl ether; diethylene glycol monobutyl ether; propylene glycol monomethyl ether acetate; propylene glycol monomethyl ether; $C_1$–$C_5$ alkyl alcohol; and mixtures thereof. The invention also relates to an emulsion for use in oil and gas well operations comprising an aqueous acid or acid-salt brine solution and the mutual solvent as described above. An emulsion according to the invention is stable, non-toxic, and effectively removes asphaltenic and paraffinic hydrocarbons from drilling equipment and oil and gas wells.

20 Claims, No Drawings

MUTUAL SOLVENTS COMPRISING 2,2,4-TRIMETHYL-1,3-PENTANEDIOL MONO-OR DI-ISOBUTYRATE AND STABLE EMULSIONS THEREOF

FIELD OF THE INVENTION

The invention relates to a mutual solvent capable of forming emulsions with aqueous acid and acid-salt brine solutions. The emulsions are stable, non-toxic, and effectively remove paraffinic and asphaltenic hydrocarbons from equipment used in oil and gas well operations.

BACKGROUND OF THE INVENTION

Oil and gas wells produce crude oils containing substantial amounts of asphaltenic and/or paraffinic hydrocarbons that accumulate on the walls, casing, tubing, etc. of wells and drilling equipment. In addition, deposits of acid-soluble material, such as calcium carbonate or clays, clog the wells and related equipment and slow down production. These deposits can become coated with the asphaltenic and/or paraffinic hydrocarbons. Accordingly, effective clean up requires a solvent that will strip off the hydrocarbons and thereby allow the deposits to break loose and move out of the well. Various techniques have been employed for the removal of deposits including the use of a mutual solvent in combination with an aqueous acidic solution. The mutual solvent is used to remove the asphaltenic and/or paraffinic hydrocarbons while the acid solution removes the acid soluble material. For example, a process wherein a mixture of an octanol and a lower alcohol is used with, ahead of or behind aqueous acid solutions to acidize oil wells is taught by U.S. Pat. No. 3,819,520. The alcohols taught by this patent, however, are not very good at dissolving or stripping asphaltenic hydrocarbons.

A solvent system for use in oil and gas wells which readily strips or dissolves asphaltenes is described by U.S. Pat. No. 5,152,907. The solvent system comprises a hydrocarbon solvent, a substantially water-soluble alcohol, and a substantially oil-soluble alcohol. However, due to growing health and safety concerns there remains a need for a system that readily dissolves or strips paraffins and asphaltenes and which avoids the use of hydrocarbons. The present invention answers this need.

SUMMARY OF THE INVENTION

It has been discovered that 2,2,4-trimethyl-1,3-pentanediol monoisobutyrate and/or 2,2,4-trimethyl-1,3-pentanediol diisobutyrate isobutyrate can be used as a principal solvent in combination with a coupling solvent and an acid stable surfactant to form a mutual solvent for use in oil and gas well operations. Accordingly, the invention relates to a mutual solvent for use in oil and gas well operations comprising at least one principal solvent selected from 2,2,4-trimethyl-1,3-pentanediol monoisobutyrate and 2,2,4-trimethyl-1,3-pentanediol diisobutyrate, at least one coupling solvent, and an acid stable surfactant. The coupling solvent is selected from ethylene glycol monobutyl ether; diethylene glycol monobutyl ether; propylene glycol monomethyl ether acetate; propylene glycol monomethyl ether, a $C_1$–$C_5$ alkyl alcohol, and mixtures thereof.

It has also been discovered that a mutual solvent according to the invention is capable of forming a stable emulsion when mixed with an aqueous acid or acid-salt brine solution. Accordingly, in another embodiment, the invention relates to an emulsion for use in oil and gas well operations comprising an aqueous acid or acid-salt brine solution and the mutual solvent as described above. An emulsion according to the invention is stable, non-toxic, non-foaming, and effectively removes asphaltenic and paraffinic hydrocarbons from drilling equipment and oil and gas wells. Accordingly, in another embodiment, the invention relates to a method for removing paraffinic and asphaltenic hydrocarbons from drilling equipment and oil and gas wells comprising the step of contacting the equipment or well with a stable emulsion according to the invention.

Additional objects and advantages of the invention are discussed in the Detailed Description which follows, and will be obvious from that description, or may be learned by practice of the invention. It is to be understood that both this summary and the following detailed description are exemplary and explanatory only and are not intended to restrict the invention.

DETAILED DESCRIPTION

The invention relates to a mutual solvent for use in oil and gas well operations comprising at least one principal solvent; at least one coupling solvent; and at least one acid stable surfactant. The principal solvent is selected from 2,2,4-trimethyl-1,3-pentanediol monoisobutyrate, 2,2,4-trimethyl-1,3-pentanediol diisobutyrate and mixtures thereof. 2,2,4-trimethyl-1,3-pentanediol monoisobutyrate and 2,2,4-trimethyl-1,3-pentanediol diisobutyrate are commercially available from Eastman Chemical Company, Kingsport, Tenn. and sold under the names TEXANOL® and TXIB® respectively. In another embodiment, the principal solvent may be an off stream product of TEXANOL®, such as, for example, solvent MTE (modified) available from Eastman Chemical Co., Texas Eastman Division, Longview, Tex. Solvent MTE comprises the following mixture of solvents:

| Components | Approximate Weight % |
| --- | --- |
| 2,2,4-trimethyl-1,3-pentanediol diisobutyrate | 5–60 |
| 2,2,4-trimethyl-1,3-pentanediol monoisobutyrate | 20–50 |
| high boilers | 5–25 |
| 3-keto-2,2,4-trimethylpentyl isobutyrate | 5–20 |
| mid boilers | 5–20 |
| 2,2-dimethyl-1,3-propanediol diisobutyrate | 5–15 |
| 2,2,4-trimethyl-1,3-pentanediol | 1–10 |
| 3-isobutoxy-2,2,4-trimethylpentanol | 0–5 |

Preferably, the principal solvent is present in the mutual solvent according to the invention at from about 5 to about 60% by weight, preferably from about 10 to about 50% by weight, more preferably from about 15 to about 35% by weight, and most preferably from about 25 to about 30% by weight based on the mutual solvent.

The coupling solvent used in a mutual solvent of the invention is preferably selected from ethylene glycol monobutyl ether; diethylene glycol monobutyl ether; propylene glycol monomethyl ether acetate; propylene glycol monomethyl ether; and a $C_1$–$C_5$ alkyl alcohol, such as, for example, methanol, ethanol, propanol, isopropanol, butanol, isobutanol, and pentanol. The coupling solvent is present in a mutual solvent according to the invention in an amount sufficient to form a stable emulsion of the principal solvent in an acid or acid/salt brine solution. Preferably, the coupling solvent is present in an amount ranging from about 1 to about 70%, more preferably about 10 to about 50%, most preferably from 15 to about 45% by weight based on the mutual solvent.

A mutual solvent according to the invention additionally comprises an acid stable surfactant to increase the stability of the mutual solvent-acid or acid/salt brine solution emulsion. In the context of the invention "acid stable surfactant" refers to a surfactant that is stable at acidic pH, preferably at a pH equal to or less than about 4. Any of the surfactants normally employed in well acidizing may be used. Preferably, the surfactant is an anionic or nonionic surfactant. Preferred anionic surfactants include alkyl phosphate esters, such as $C_8$–$C_{20}$ aliphatic or aromatic straight or branched chain phosphate esters. Suitable alkyl phosphate esters useful as the acid stable surfactant in a mutual solvent according to the invention include STRODEX PSK-28, STRODEX P-100, and STRODEX PK-90, available from Dexter Chemical Corp., TANATERGE PE-37 and TANATERGE PE-67 available from Sybron Chemicals Inc. (previously Dexter Chemical Corp.), and RHODAFAC PL-620, RHODAFAC PE-510, RHODAFAC RE-410, RHODAFAC RE-610, RHODAFAC RE-960, RHODAFAC DX-660, RHODAFAC RS-410, RHODAFAC RS-610, and RHODAFAC RS-710 available from Rhone Poulenc. Suitable nonionic acid stable surfactants include oxyalkylated alcohols, oxyalkylated phenols, and oxyalkylated polyols having an HLB ranging from about 2 to about 10.

The acid stable surfactant is present in an amount sufficient to stabilize an emulsion of the principal solvent in an acid or acid/salt brine solution, preferably the acid stable surfactant is present at from about 1% to about 40%, more preferably from about 10% to about 30%, most preferably from about 15% to about 25% by weight based on the mutual solvent.

In a particularly preferred embodiment, a mutual solvent according to the invention comprises:

(a) about 26% by weight of 2,2,4-trimethyl-1,3-pentanediol mono- or di-isobutyrate;

(b) about 10% by weight of diethylene glycol monobutyl ether;

(c) about 39% by weight of isopropanol; and (d) about 25% by weight of a $C_8$–$C_{20}$ aromatic phosphate ester.

Generally, the mutual solvent of the invention is prepared by mixing using at least one principal solvent, at least one coupling solvent and at least one acid stable surfactant until a homogenous mixture is obtained. Any conventional mixing means may be employed.

A mutual solvent according to the invention can be used in conjunction with acid and acid-salt brine solutions normally employed in oil and gas well operations. Accordingly, in another embodiment, the invention relates to an emulsion for use in oil and gas well operations comprising an aqueous acid or acid/salt brine solution and a mutual solvent as defined above. Any of the aqueous solutions of water-soluble acids normally used in well acidizing may be used. Suitable acid solutions useful in an emulsion according to the invention include aqueous solutions of hydrochloric acid, hydrofluoric acid, sulfamic acid, organic acids, such as acetic acid and formic acid, and mixtures thereof. The aqueous acid solution generally contains from about 5 to about 30%, preferably about 15% by weight of at least one water-soluble acid.

Acid-salt brine solutions for use in the emulsion of the invention can be prepared by adding from about 1 to about 10% by weight based on the total acid solution of a sodium, calcium, or zinc salt to the acid solution. Examples of suitable salts include sodium chloride, sodium carbonate, potassium chloride, potassium carbonate, calcium chloride, calcium bromide, zinc chloride, zinc bromide, and mixtures thereof.

The amount of acid solution or acid-salt brine solution and mutual solvent present in an emulsion according to the invention varies depending on the type of equipment or well to be treated and the type of material to be removed. Generally, however, an emulsion of the invention comprises from about 10 to about 85% by weight of the acid or acid/salt brine solution and from about 15 to about 90% by weight of the mutual solvent. Preferably, an emulsion according to the invention comprises about 85% of the acid or acid/salt brine solution and about 15% of the mutual solvent.

An emulsion according to the invention can be prepared by adding the mutual solvent to the acid solution or the acid-salt brine solution with mixing. Any method of mixing may be employed. In a preferred embodiment, the acid solution or the acid-salt brine solution is mixed using a high speed mixer, such as, a Janke-Kunkel IKA Labortechnik Ultra-turrax T50 mixer. The mutual solvent is then slowly added while mixing continues. Emulsions according to the invention are stable for 8 hours or longer at ambient temperature, and preferably, as in some cases, for 24 hours or more. Further, emulsions according to the invention are clear, low foaming, and are effective at dispersing paraffin and asphaltenes. Indeed, when compared to emulsions containing the conventionally used SY-STIM® mutual solvents, (a mutual solvent containing hydrocarbons available from Beaumark Industries, Inc.) emulsions according to the invention produce less foam and are effective at dispersing paraffin and crude oil.

Any of the additives commonly employed in conventional acidic emulsions used for cleaning oil and gas wells and drilling equipment can be used in the emulsions of the invention. Examples of such additives include viscosity control agents, complexing agents, and corrosion inhibitors as taught, for example, by U.S. Pat. No. 3,481,404, the disclosure of which is herein incorporated by reference.

The emulsions of the invention can be used for both onshore and offshore drilling operations and can be used to clean up oil and gas wells, well bores, well tubing, and drilling equipment, including drilling pits and surface equipment. Generally, the equipment to be treated is contacted with an emulsion according to the invention by conventional means, for example, as taught by U.S. Pat. Nos. 3,548,945 and 3,481,404, the disclosures of which are herein incorporated by reference. For example, the emulsion according to the invention may be pumped into a wellbore and/or associated equipment to be treated. Preferably, the emulsions are pumped at a pressure sufficient to achieve maximum removal of asphaltenic and paraffinic hydrocarbons present in the wellbore and/or associated equipment and thereby allow acid soluble deposits to break loose and move out of the well. Generally, the equipment is contacted with an emulsion according to the invention at ambient temperature. The temperature of the emulsion typically ranges from ambient temperature to about 90° C., preferably from about 40 to about 85° C., most preferably from about 80 to about 85° C. In actual oil fluid use, the emulsion will be continuously mixed due to the mild agitation that occurs while pumping into the oil well to be treated. The well may be returned to production as soon after contact with the emulsion as practicable. No specific waiting period is required. The procedures used will vary depending in part upon the type of equipment to be treated and the material to be removed.

EXAMPLES

The following examples are given to illustrate the invention. It should be understood, however, that the invention is not to be limited to the specific conditions or details set forth in these examples.

A total of 41 mutual solvent formulations were mixed with hydrochloric acid solution or hydrochloric acid salt brine solution using the following procedure:

1. The components of the mutual solvent were mixed with a magnetic stirrer until a uniform blend was obtained (usually 10–15 minutes).
2. An aqueous solution of hydrochloric acid was prepared by adding hydrochloric acid to water to produce a 15% acid solution.
3. An aqueous acid-salt brine solution was prepared by adding 3% sodium chloride, 2% calcium chloride, and 1% sodium carbonate to the 15% hydrochloric acid solution.
4. 22.5 ml (15% by weight of the total emulsion) of the mutual solvent was slowly added to 127.5 ml (85% by weight of the total emulsion) of 15% HCl/salt brine solution while mixing using a Janke-Kunkel IKA Labortechnik Ultra-turrax T-50 mixer.
5. Mixing continued for 5 minutes and the emulsion was poured into a 100 ml graduated cylinder with a stopper placed on the top of the cylinder at room temperature. In each case a two phase emulsion was obtained.
6. Any layering that occurred in the two phases was recorded every 30 minutes over an 8 hour time period and in some cases again after a total of 24 hours. The first number represents the milliliters of separation in the top phase, i.e., the oil phase, and the second number represents the milliliters of separation in the bottom phase, i.e., the water phase. Separations of from about 1% based on total volume (1 ml) to about 10% based on volume (10 ml) over a period of eight hours were considered to be of adequate stability. The amount of foaming was also determined by visual examination and subjective scoring of each graduated cylinder. The following scores were given:
   0=no foaming
   1=less than or equal to 1% by volume of foam persisting after 8 hours
   2=from about 5 to about 10% by volume of foam persisting after 8 hours
   3=greater than 10% volume of foam persisting after 8 hours.

The preceding procedure was used to evaluate the stability of acid and acid/salt brine emulsions of a commercially available mutual solvent containing hydrocarbons, sold under the name SY-STIM® 128 by Beaumark Industries, Inc., compared to emulsions containing a mutual solvent according to the invention. The results are tabulated in the tables set forth below.

TABLE Ia

Mutual Solvent Formulations (mixed with 85% hydrochloric acid solution)

|  | Ex. 1* | Ex. 2 | Ex. 3 | Ex. 4 | Ex. 5 |
|---|---|---|---|---|---|
| SY-STIM ® 128 | 100% | | | | |
| Isopropyl Alcohol | | 43% | 43% | 43% | 43% |
| TEXANOL ®M | | 26% | 26% | 26% | 26% |
| Butyl alcohol | | 16% | | | |
| PL-620 surfactant | | 15% | 15% | 15% | 15% |

TABLE Ia-continued

Mutual Solvent Formulations (mixed with 85% hydrochloric acid solution)

|  | Ex. 1* | Ex. 2 | Ex. 3 | Ex. 4 | Ex. 5 |
|---|---|---|---|---|---|
| Isobutyl alcohol | | | 16% | | |
| Pentanol | | | | 16% | |
| 2-ethyl hexanol | | | | | 16% |
| Foaming score | 2 | 1 | 1 | 1 | 1 |

*Comparative Example

TABLE Ib

Stability Test

| Stability Test (ml separation top/bottom) after | Ex. 1* | Ex. 2 | Ex. 3 | Ex. 4 | Ex. 5 |
|---|---|---|---|---|---|
| 0.5 hour | 0/0 | 1/0 | 3.50 | 4/0 | 5.5/0 |
| 1 hour | 0/0 | 1/0 | 4/0 | 5/0 | 5.5/0 |
| 1.5 hours | 0/0 | 1/0 | 5/0 | 5/0 | 6/0 |
| 2 hours | 0/0 | 1/0 | 5/0 | 5/0 | 6/0 |
| 2.5 hours | 0/0 | 1/0 | 5/0 | 5/0 | 8/0 |
| 3 hours | 0/0 | 1/0 | 5/0 | 5.5/0 | 8/0 |
| 3.5 hours | 0/0 | 1/0 | 5/0 | 5.5/0 | 8.5/0 |
| 4 hours | 0/0 | 1/0 | 5/0 | 5.5/0 | 8.5/0 |
| 4.5 hours | 0/0 | 1/0 | 5/0 | 5.5/0 | 8.5/0 |
| 5 hours | 0/0 | 1/0 | 5/15 | 7/20 | 9/7 |
| 5.5 hours | 0/0 | 1/0 | 5/22 | 6/21 | 9/9 |
| 6 hours | 0/0 | 1/0 | 5/20 | 6/23 | 7/9 |
| 6.5 hours | 0/0 | 1/0 | 5/20 | 6/24 | 7/10 |
| 7 hours | 0/0 | 1/0 | 5/30 | 6/35 | 7/17 |
| 7.5 hours | 0/0 | 1/0 | 5/35 | 6/42 | 7/25 |
| 8 hours | 0/0 | 1/0 | 5/60 | 6/50 | 7/30 |

*Comparative Example

TABLE IIa

Mutual Solvent Formulations (mixed with 85% hydrochloric acid solution)

|  | Ex. 6* | Ex. 7 | Ex. 8 | Ex. 9 | Ex. 10* |
|---|---|---|---|---|---|
| SY-STIM 128 | 100% | | | | |
| Isopropyl Alcohol | | 60% | | 43% | 43% |
| TEXANOL ® | | 25% | 25% | 26% | |
| Butyl alcohol | | | 60% | 31% | 16% |
| PL-620 surfactant | | 15% | 15% | | 15% |
| diethylene glycol monobutyl ether | | | | | 26% |
| Foaming Score | 3 | 1 | 1 | 1 | 1 |

*Comparative Example

TABLE IIb

Stability Tests

| Stability Test (ml separation top/bottom) after | Ex. 6* | Ex. 7 | Ex. 8 | Ex. 9 | Ex. 10* |
|---|---|---|---|---|---|
| 0.5 hour | 0/0 | 4/0 | 9/0 | 7/0 | 0/0 |
| 1 hour | 0/0 | 4/0 | 9/2 | 7/0 | 0/0 |
| 1.5 hours | 0/0 | 4/0 | 9/2 | 8/0 | 0/0 |
| 2 hours | 0/0 | 4/2 | 9/5 | 8/3 | 0/0 |
| 2.5 hours | 0/0 | 4/2 | 9/5 | 8/3 | 0/0 |
| 3 hours | 0/0 | 4/3 | 9/5 | 8/5 | 0/0 |
| 3.5 hours | 0/0 | 4/5 | 9/18 | 8/5 | 0/0 |
| 4 hours | 0/0 | 5/8 | 9/23 | 8/8 | 0/0 |
| 4.5 hours | 0/0 | 5/10 | 9/25 | 8/9 | 0/0 |
| 5 hours | 0/0 | 5/12 | 9.5/30 | 8/11 | 0/0 |
| 5.5 hours | 0/0 | 5/19 | 9/40 | 8/11 | 0/0 |
| 6 hours | 0/0 | 5/20 | 10/40 | 8/10 | 0/0 |
| 6.5 hours | 0/0 | 5/30 | 10/50 | 8/10 | 0/0 |

TABLE IIb-continued

Stability Tests

| Stability Test (ml separation top/bottom) after | Ex. 6* | Ex. 7 | Ex. 8 | Ex. 9 | Ex. 10* |
|---|---|---|---|---|---|
| 7 hours | 0/0 | 5/31 | 10/60 | 8/25 | 0/0 |
| 7.5 hours | 0/0 | 5/35 | 10/70 | 8/28 | 0/0 |
| 8 hours | 0/0 | 5/50 | 10/80 | 8/30 | 0/0 |

*Comparative Example

TABLE IIIa

Mutual Solvent Formulations (mixed with 85% hydrochloric acid/salt brine solutions)

| | Ex. 11* | Ex. 12 | Ex. 13 | Ex. 14 | Ex. 15 | Ex. 16 | Ex. 17 |
|---|---|---|---|---|---|---|---|
| SY-STIM ® 128 | 100% | | | | | | |
| Isopropyl Alcohol | | 43% | 43% | | 27% | 27% | |
| TEXANOL ® | | 26% | 26% | 26% | 26% | 26% | 25% |
| Butyl alcohol | | | | 16% | 16% | 16% | |
| PL-620 surfactant | | 15% | 15% | 15% | 15% | 15% | 15% |
| diethylene glycol monobutyl ether | | 16% | | 43% | 16% | | 60% |
| propylene glycol monomethyl ether acetate | | | 16% | | | 16% | |
| Foaming Score | 3 | 1 | 7 | 1 | 1 | 1 | 1 |

*Comparative Example

TABLE IIIb

Stability Test

| Stability Test (ml separation top/bottom) after | Ex. 11* | Ex. 12 | Ex. 13 | Ex. 14 | Ex. 15 | Ex. 16 | Ex. 17 |
|---|---|---|---|---|---|---|---|
| 0.5 hours | 4/0 | 4/0 | 4.5/0 | 10/0 | 5/0 | 5.5/0 | 1/0 |
| 1 hour | 4/0 | 5/0 | 6/0 | 10.5/0.5 | 5.5/0 | 5.5/0 | 5/0 |
| 1.5 hours | 4/0 | 5/1 | 7/2 | 11/4 | 5.5/0 | 6/0 | 5/0 |
| 2 hours | 4/0 | 5/2.5 | 7/3 | 11/6 | 7/0 | 6/0 | 5/0 |
| 2.5 hours | 4/0 | 5/4 | 7/3 | 11.5/8 | 7/2 | 6/1.5 | 5/0.5 |
| 3 hours | 4/0 | 5/4 | 7/3 | 11.5/8 | 7/5 | 6/3 | 5/0.5 |
| 3.5 hours | 4/0 | 5/9 | 7/4 | 11.5/21 | 7/6 | 6/5 | 5.5/1.5 |
| 4 hours | 4/0 | 5/1 | 7/8 | 11.5/21 | 7/8 | 6/5 | 5/3 |
| 4.5 hours | 4/0 | 5/15 | 7/13 | 11.5/22 | 7/10 | 6/11 | 5/6 |
| 5 hours | 4/0 | 5/18 | 7/14 | 11.5/25 | 7/24 | 6/15 | 5/11 |
| 5.5 hours | 4/0 | 5/22 | 7/18 | 11.5/30 | 7/25 | 6/18 | 5/11 |
| 6 hours | 4/0 | 5/36 | 7/20 | 11.5/40 | 7/26 | 6/23 | 5/22 |
| 6.5 hours | 4/0 | 5/40 | 7/33 | 11.5/52 | 7/47 | 6/30 | 5/25 |
| 7 hours | 4/0 | 5/59 | 7/54 | 11.5/80 | 7/52 | 6/38 | 5/50 |
| 7.5 hours | 4/0 | 5/85 | 7/57 | 11.5/89 | 7/79 | 6/57 | 5/55 |
| 8 hours | 4/0 | 5/87 | 7/85 | 11.5/88 | 7/93 | 6/57 | 5/94 |

*Comparative Example

TABLE IVa

Mutual Solvent Formulations (mixed with 85% hydrochloric acid acid/salt brine solutions)

| | Ex. 18* | Ex. 19 | Ex. 20 | Ex. 21 | Ex. 22* | Ex. 23 | Ex. 24 |
|---|---|---|---|---|---|---|---|
| SY-STIM ® 128 | 100% | | | | | | |
| Isopropyl Alcohol | | 39% | 39% | 34% | 43% | 34% | 29% |
| TEXANOL ® | | 26% | 26% | 26% | | 26% | 26% |
| PL-620 surfactant | | 15% | 20% | 25% | 15% | 20% | 25% |
| diethylene glycol monobutyl ether | | 20% | 15% | 15% | 42% | 20% | 20% |
| Foaming Score | 3 | 1 | 1 | 1 | 4 | 1 | 1 |

*Comparative Example

TABLE IVb

Stability Test

| Stability Test (ml separation top/bottom) after | Ex. 18* | Ex. 19 | Ex. 20 | Ex. 21 | Ex. 22* | Ex. 23 | Ex. 24 |
|---|---|---|---|---|---|---|---|
| 0.5 hour | 1.5/0 | 4/0 | 4/0 | 2/0 | 0/0 | 05/0 | 0/0 |
| 1 hour | 2/0 | 4/0 | 3.5/0 | 2/05 | 0/0 | 3/0 | 2/0 |
| 1.5 hours | 3/0 | 4/0 | 4/0 | 3/0 | 0/0 | 4/0 | 3/0 |
| 2 hours | 3/0 | 5/0 | 4/0 | 3/0 | 0/0 | 4/0 | 3/0 |
| 2.5 hours | 3/0 | 5/2 | 4/2 | 3/1 | 0/0 | 4/0 | 3/0 |
| 3 hours | 3/0 | 5/7 | 4/4 | 3/2 | 0/0 | 4/1 | 3/1 |
| 3.5 hours | 3/0 | 5/8 | 4/5 | 3/6 | 0/0 | 4/5 | 3/5 |
| 4 hours | 4/2 | 5/10 | 4/11 | 3/10 | 0/0 | 4/9 | 3/12 |
| 4.5 hours | 4/2 | 5/10 | 4/11 | 3/10 | 0/0 | 4/9 | 3/12 |
| 5 hours | 4/2 | 5/12 | 4/19 | 3/20 | 0/0 | 4/11 | 3/16 |
| 5.5 hours | 4/2 | 5/12 | 4/19 | 3/20 | 0/0 | 4/11 | 3/16 |
| 6 hours | 4/2 | 5/25 | 4/28 | 3/31 | 0/0 | 4/17 | 3/22 |
| 6.5 hours | 4/2 | 5/26 | 4/30 | 3/33 | 0/0 | 4/26 | 3/28 |
| 7 hours | 4/3 | 5/40 | 5/44 | 3/50 | 0/0 | 4/26 | 3/35 |
| 7.5 hours | 4/3 | 5/60 | 4/64 | 3/70 | 0/0 | 4/44 | 3/53 |
| 8 hours | 4/9 | 5/80 | 4/75 | 3/82 | 0/0 | 4/63 | 3/37 |

TABLE Va

Mutual Solvent Formulations (mixed with 85% hydrochloric acid/salt brine solutions)

| | Ex. 25* | Ex. 26 | Ex. 27 | Ex. 28 | Ex. 29 |
|---|---|---|---|---|---|
| SY-STIM ® 128 | 100% | | | | |
| Isopropyl Alcohol | | 29% | 39% | 44% | 24% |
| TEXANOL ® | | 26% | 26% | 26% | 26% |
| PL-620 surfactant | | 25% | 25% | 25% | 25% |
| diethylene glycol monobutyl ether | | 20% | 10% | 5% | 25% |
| Foaming Score | 3 | 1 | 1 | 1 | 4 |

*Comparative Example

TABLE Vb

Stability Test

| Stability Test (ml separation top/bottom) after | Ex. 25* | Ex. 26 | Ex. 27 | Ex. 28 | Ex. 29 |
|---|---|---|---|---|---|
| 0.5 hour | 4/0 | 2.5/0 | 2.5/0 | 3/0 | 4/0 |
| 1 hour | 4/0 | 3/0 | 2.5/0 | 3/0 | 4/0 |
| 1.5 hours | 4/0 | 3/0 | 3/0 | 3.5/0 | 4.5/0 |
| 2 hours | 4.5/1 | 3/2.5 | 3/2 | 3.5/3.5 | 4.5/2 |
| 2.5 hours | 4.5/2 | 3/7 | 3/6 | 3.5/6 | 5/5 |
| 3 hours | 4.5/2 | 3/7 | 3/6 | 3.5/6 | 5/5 |
| 3.5 hours | 4.5/5 | 3/15 | 3/12 | 3.5/9 | 5/9 |
| 4 hours | 4.5/5 | 3/20 | 3/19 | 3.5/14 | 5/15 |
| 4.5 hours | 4.5/9 | 3/28 | 3/24 | 3.5/21 | 5/19 |
| 5 hours | 4.5/9 | 3/34 | 3/25 | 3.5/23 | 5/23 |
| 5.5 hours | 4.5/11 | 3/43 | 3/32 | 3.5/28 | 5/31 |

TABLE Vb-continued

Stability Test

| Stability Test (ml separation top/bottom) after | Ex. 25* | Ex. 26 | Ex. 27 | Ex. 28 | Ex. 29 |
|---|---|---|---|---|---|
| 6 hours | 4.5/12 | 3/62 | 3/41 | 3.5/32 | 5/40 |
| 6.5 hours | 4.5/16 | 3/85 | 3/55 | 3.5/63 | 5/72 |
| 7 hours | 4.5/16 | 3/85 | 3/55 | 3.5/63 | 5/72 |
| 7.5 hours | 4.5/16 | 3/97 | 3/90 | 3.5/80 | 5/90 |
| 8 hours | 4.5/19 | 3/97 | 3/97 | 3.5/90 | 5/95 |

TABLE VIa

Mutual Solvent Formulations
(mixed with 85% hydrochloric acid/salt brine solution)

| | Ex. 30* | Ex. 31 | Ex. 32 | Ex. 33 | Ex. 34 | Ex. 35 |
|---|---|---|---|---|---|---|
| SY-STIM ® 128 | 100% | | | | | |
| Isopropyl Alcohol | | 39% | 39% | 39% | 39% | 29% |
| TEXANOL ® | | | 26% | | 26% | 26% |
| TXIB ® | | 26% | | | | |
| Eastman Solvent MTE | | | | 26% | | |
| PL-620 surfactant | | 25% | 25% | 25% | 25% | 25% |
| diethylene glycol monobutyl ether | | 10% | 10% | 10% | | |
| propylene glycol monomethyl ether acetate | | | | | 10% | 20% |
| Foaming Score | 3 | 2 | 1 | 1 | 1 | 1 |

*Comparative Example

TABLE VIb

Stability Test

| Stability Test (ml separation top/bottom) after | Ex. 30* | Ex. 31 | Ex. 32 | Ex. 33 | Ex. 34 | Ex. 35 |
|---|---|---|---|---|---|---|
| 0.5 hour | 2/0 | 0/0 | 3/0 | 3/0 | 3.5/0 | 3/0 |
| 1 hour | 2/0 | 0/0 | 3.5/0 | 3/0 | 3.5/0 | 3/0 |
| 1.5 hours | 2/0 | 0/0 | 3.5/0 | 3/0 | 3.5/0 | 3/0 |
| 2 hours | 2.5/0 | 0/0 | 3.5/0 | 3/0 | 3.5/0 | 3/0 |
| 2.5 hours | 2.5/0 | 0/0 | 3.5/0 | 3/0 | 3.5/0 | 3/0 |
| 3 hours | 3/1 | 0/0 | 3/6 | 4/0 | 4/5 | 3.5/4 |
| 3.5 hours | 3/1 | 0/0 | 3/7 | 4/0 | 4.5/5 | 3.5/4 |
| 4 hours | NR* | NR | NR | NR | NR | NR |
| 4.5 hours | 4/2 | 0/0 | 4/16 | 4/0 | 5/15 | 4/12 |
| 5 hours | 4/3 | 0/0 | 4/21 | 4/0 | 5/23 | 4/15 |
| 5.5 hours | 4/3 | 0/0 | 4/35 | 4/0 | 5/25 | 4/22 |
| 6 hours | 4/3 | 0/0 | 4/35 | 4/0 | 5/29 | 4/28 |
| 6.5 hours | 4/4 | 0/0 | 4/52 | 4/0 | 5/35 | 4/32 |
| 7 hours | 4/4 | 0/0 | 4/70 | 4/0 | 5/50 | 4/35 |
| 7.5 hours | NR | NR | NR | NR | NR | NR |
| 8 hours | NR | NR | NR | NR | NR | NR |
| 24 hours | NR | NR | NR | NR | NR | NR |

*Comparative Example
*NR = No readings for separation were made.

TABLE VIIa

Mutual Solvent Formulations
(mixed with 85% hydrochloric acid solution)

| | Ex. 36 | Ex. 37* | Ex. 38 | Ex. 39 | Ex. 40 | Ex. 41 |
|---|---|---|---|---|---|---|
| SY-STIM ® 128 | 100% | | | | | |
| Isopropyl Alcohol | 36% | | 39% | 39% | 39% | 29% |
| TEXANOL ® | 26% | | | 26% | | 26% |
| TXIB ® | | | 26% | | | |
| Eastman Solvent MTE | | | | | 26% | |
| PL-620 surfactant | 15% | | 25% | 25% | 25% | 25% |
| diethylene glycol monobutyl ether | | | 10% | 10% | 10% | |
| propylene glycol monomethyl ether acetate | | | | | | 20% |
| 2-ethyl hexanol | 16% | | | | | |
| Methanol | 7% | | | | | |
| Foaming Score | 1 | 3 | 2 | 1 | 3 | 1 |

*Comparative Example

TABLE VIIb

Stability Test

| Stability Test (ml separation top/bottom) after | Ex. 36 | Ex. 37* | Ex. 38 | Ex. 39 | Ex. 40 | Ex. 41 |
|---|---|---|---|---|---|---|
| 0.5 hours | 7/0 | 0/0 | 0/0 | 2/0 | 0/0 | 1/0 |
| 1 hour | 7/0 | 0/0 | 0/0 | 3/0 | 0/0 | 2/0 |
| 1.5 hours | 7/0 | 0/0 | 0/0 | 3/0 | 0/0 | 2/0 |
| 2 hours | 8/0 | 0/0 | 0/0 | 3/0 | 1/0 | 3/0 |
| 2.5 hours | 8/2 | 0/0 | 0/0 | 3/0 | 1/0 | 3/0 |
| 3 hours | 8/5 | 0/0 | 0/0 | 3/4 | 1/0 | 3/2 |
| 3.5 hours | 8/5 | 0/0 | 0/0 | 3/5 | 2/0 | 3/2 |
| 4 hours | 8/6 | 0/0 | 0/0 | 3/6 | 2/0 | 3/4 |
| 4.5 hours | 8/9 | 0/0 | 0/0 | 3/6 | 2/0 | 3/5 |
| 5 hours | 8/11 | 0/0 | 0/2 | 3/11 | 2/0 | 3/7 |
| 5.5 hours | 8/14 | 0/0 | 0/4 | 3/18 | 2/0 | 3/9 |
| 6 hours | 8/14 | 0/0 | 0/4 | 3/18 | 2/0 | 3/11 |
| 6.5 hours | 8/15 | 0/0 | 0/4 | 3/22 | 2/0 | 3/17 |
| 7 hours | 8/30 | 0/0 | 0/5 | 3/28 | 2/0 | 3/29 |
| 7.5 hours | 8/50 | 0/0 | 0/5 | 3/35 | 2/0 | 3/30 |
| 24 hours | 8/0 | 1/0 | 0/0 | 3/0 | 3.5/0 | 3/0 |

Example 42

The emulsions of Examples 27, 31, 33, 35, and 39 and Comparative Example 22 were tested for the capacity to disperse paraffin and/or asphaltenes according to the following procedure:

1. 17 grams of paraffin was placed in an 8 ounce jar and heated in a water bath to above the melting point of paraffin, i.e., about 80–84° C., the jar was removed from the heat source, and the paraffin was allowed to solidify. The jar was swirled while cooling to room temperature to allow paraffin coating on side of bottle.
2. 150 ml of emulsion at room temperature was added to an 8 ounce jar coated with paraffin/crude oil.
3. The jar was heated in a hot water bath at a temperature above the melting point of the paraffin, i.e., about 80–84° C., and mixed with a magnetic stirrer.
4. Heating at about 80–84° C. and mixing continued for 2 hours.
5. The hot mixture was poured through a large mesh filter. The amount of residue on the filter was determined by measuring the difference between the weight of the filter before and after filtering.

The results are set forth in Table VIII below:

TABLE VIII

| | Dispersion Test | | | | | | |
|---|---|---|---|---|---|---|---|
| Residue Remaining on Filter (grams) | Ex. 22* | Ex. 25 | Ex. 27 | Ex. 31 | Ex. 33 | Ex. 35 | Ex. 39 |
| | 0.2 | 0.3 | 0.5 | 0.2 | 1.7 | 0.3 | 0.2 |

*Comparative Example

What is claimed:

1. A mutual solvent for use in oil and gas well operations comprising:
    a) at least one principal solvent selected from the group consisting of 2,2,4-trimethyl-1,3-pentanediol monoisobutyrate and 2,2,4-trimethyl-1,3-pentanediol diisobutyrate;
    (b) at least one coupling solvent selected from the group consisting of ethylene glycol monobutyl ether; diethylene glycol monobutyl ether; propylene glycol monomethyl ether acetate; and propylene glycol monomethyl ether, a $C_1$–$C_5$ alkyl alcohol; and
    (c) at least one acid stable surfactant, wherein the acid stable surfactant is not a coupling solvent as defined in (b).

2. The mutual solvent according to claim 1 comprising:
    (a) from about 5 to about 60% by weight of said principal solvent;
    (b) from about 5 to about 70% by weight of said coupling solvent; and
    (c) from about 10 about 30% by weight of said acid stable surfactant.

3. The mutual solvent according to claim 2, wherein said acid stable surfactant (c) is a $C_8$–$C_{20}$ alkyl phosphate ester.

4. A mutual solvent according to claim 1 comprising:
    (a) about 26% by weight of said principal solvent;
    (b) about 10% by weight of diethylene glycol monobutyl ether;
    (c) about 39% by weight of isopropyl alcohol; and
    (d) about 25% by weight of a $C_8$–$C_{20}$ aromatic phosphate ester.

5. An emulsion for use in oil and gas well operations comprising an aqueous acid or acid/salt brine solution and a mutual solvent, wherein said mutual solvent comprises:
    (a) at least one principal solvent selected from one group consisting of 2,2,4-trimethyl-1,3-pentanediol monoisobutyrate and 2,2,4-trimethyl-1,3-pentanediol diisobutyrate; and
    (b) a coupling solvent present in an amount sufficient to form an emulsion of said 2,2,4-trimethyl-1,3-pentanediol monoisobutyrate in said acid/salt brine solution, wherein said coupling solvent is selected from the group consisting of ethylene glycol monobutyl ether; diethylene glycol monobutyl ether; propylene glycol monomethyl ether acetate; propylene glycol monomethyl ether; a $C_1$–$C_5$ alkyl alcohol; and mixtures thereof; and
    (c) an acid stable surfactant present in an amount sufficient to stabilize said emulsion, wherein the acid stable surfactant is not a coupling solvent as defined in (b).

6. The emulsion according to claim 5 comprising from about 10 to about 85% of said aqueous acid/salt brine solution and from about 15% to about 90 of said mutual solvent.

7. The emulsion according to claim 5, wherein said mutual solvent comprises:
    (a) from about 5 to about 60% of said principal solvent;
    (b) from about 5 to about 70% of said coupling solvent; and
    (c) from about 10 to about 30% of said surfactant.

8. The emulsion according to claim 5, wherein said surfactant is a $C_8$–$C_{20}$ alkyl phosphate ester.

9. The emulsion according to claim 5, wherein said salt/brine solution comprises an aqueous solution of 15% hydrochloric acid and from about 1 to about 10% by weight based on the aqueous solution of a salt selected from the group consisting of sodium chloride, sodium carbonate, potassium chloride, potassium carbonate, calcium chloride, calcium bromide, zinc chloride, zinc bromide, and mixtures thereof.

10. The emulsion according to claim 5, wherein said aqueous acid solution of is a 15% solution of hydrochloric acid.

11. The emulsion according to claim 5, which is stable for at least about 8 hours.

12. The emulsion according to claim 5 which is stable for at least about 24 hours.

13. A process for removing paraffin and asphaltenes from drilling equipment comprising the step of contacting said equipment with an emulsion according to claim 5.

14. The process according to claim 13, wherein the contacting step is conducted at ambient temperature.

15. The process according to claim 13, wherein the temperature of the emulsion during the contacting step ranges from ambient temperature to about 85° C.

16. The process according to claim 13, wherein the drilling equipment is selected from drilling pits, surface equipment, and well bores.

17. A process for forming an emulsion of an acid or acid/salt brine solution and a mutual solvent for use in oil and gas well operations, said process comprising:
    (i) preparing a mutual solvent comprising mixing the following:
        (a) at least one principal solvent selected from the group consisting of 2,2,4-trimethyl-1,3-pentanediol monoisobutyrate and 2,2,4-trimethyl-1,3-pentanediol diisobutyrate;
        (b) at least one coupling solvent selected from the group consisting of ethyleneglycol monobutyl ether; diethylene glycol monobutyl ether; propylene glycol monomethyl ether acetate; propylene glycol monomethyl ether; a $C_1$–$C_5$ alkyl alcohol; and
        (c) at least one acid stable surfactant, with sufficient stirring to provide a uniform blend, wherein the acid stable surfactant is not a coupling solvent as defined in (b);
    (ii) mixing said uniform blend obtained from step (i) with an acid or acid/salt brine solution to form a stable emulsion.

18. A process according to claim 17, wherein said acid solution is a 15% aqueous solution of hydrochloric acid.

19. A process according to claim 17, wherein said acid/salt brine solution comprises an aqueous solution of 15% hydrochloric acid and from about I to about 10% by weight based on the aqueous solution of a salt selected from the group consisting of sodium chloride, sodium carbonate, potassium chloride, potassium carbonate, calcium chloride, calcium bromide, zinc chloride, zinc bromide, and mixtures thereof.

20. An emulsion of an acid or acid/salt brine solution and a mutual solvent made by the process according to claim 17.

* * * * *